United States Patent [19]

Georgiev et al.

[11] 4,270,697

[45] Jun. 2, 1981

[54] IMPULSE-TYPE SINKING HYDRANT

[75] Inventors: Vesselin Y. Georgiev; Vladimir S. Mednikarov, both of Sofia, Bulgaria

[73] Assignee: Institute Po Mechanika I Biomechanika, Sofia, Bulgaria

[21] Appl. No.: 29,479

[22] Filed: Apr. 12, 1979

[30] Foreign Application Priority Data

Apr. 17, 1978 [BG] Bulgaria .................................. 39446

[51] Int. Cl.³ .............................................. B05B 1/08
[52] U.S. Cl. ...................................... 239/99; 239/204
[58] Field of Search ............. 239/66, 99, 101, 203–205

[56] References Cited

U.S. PATENT DOCUMENTS

| 1,984,531 | 12/1934 | Kind et al. | 239/99 |
| 1,998,592 | 4/1935 | Schenk | 239/99 |

FOREIGN PATENT DOCUMENTS

| 972006 | 7/1975 | Canada | 239/204 |

*Primary Examiner*—Robert W. Saifer
*Attorney, Agent, or Firm*—Karl F. Ross

[57] ABSTRACT

An impulse-sinking hydrant having an upright cylindrical housing with a movable piston disposed therein and formed with a radial passageway and an upright stem having a first passageway communicating with the radial passageway, the upright stem extending above the housing in an upper position of the piston. The upper end of the housing communicates with a pressure-accumulative reservoir through a second passageway which lies in registration with the radial passageway when the piston is in the upper position. A supply conduit carrying water under pressure communicates with the reservoir through a third passageway and with the interior of the housing through a fourth passageway feeding into the lower end thereof for displacing the piston upwardly. A valve member vertically disposed in the third passageway is displaceable by the water from the supply conduit into a radial passageway blocking position for allowing the water to feed into the reservoir and, upon equalization of the water pressure in the reservoir with the water pressure in the supply conduit, the valve being displaceable by gravity into a supply conduit blocking position for allowing the water from the reservoir to feed into the radial passageway.

3 Claims, 1 Drawing Figure

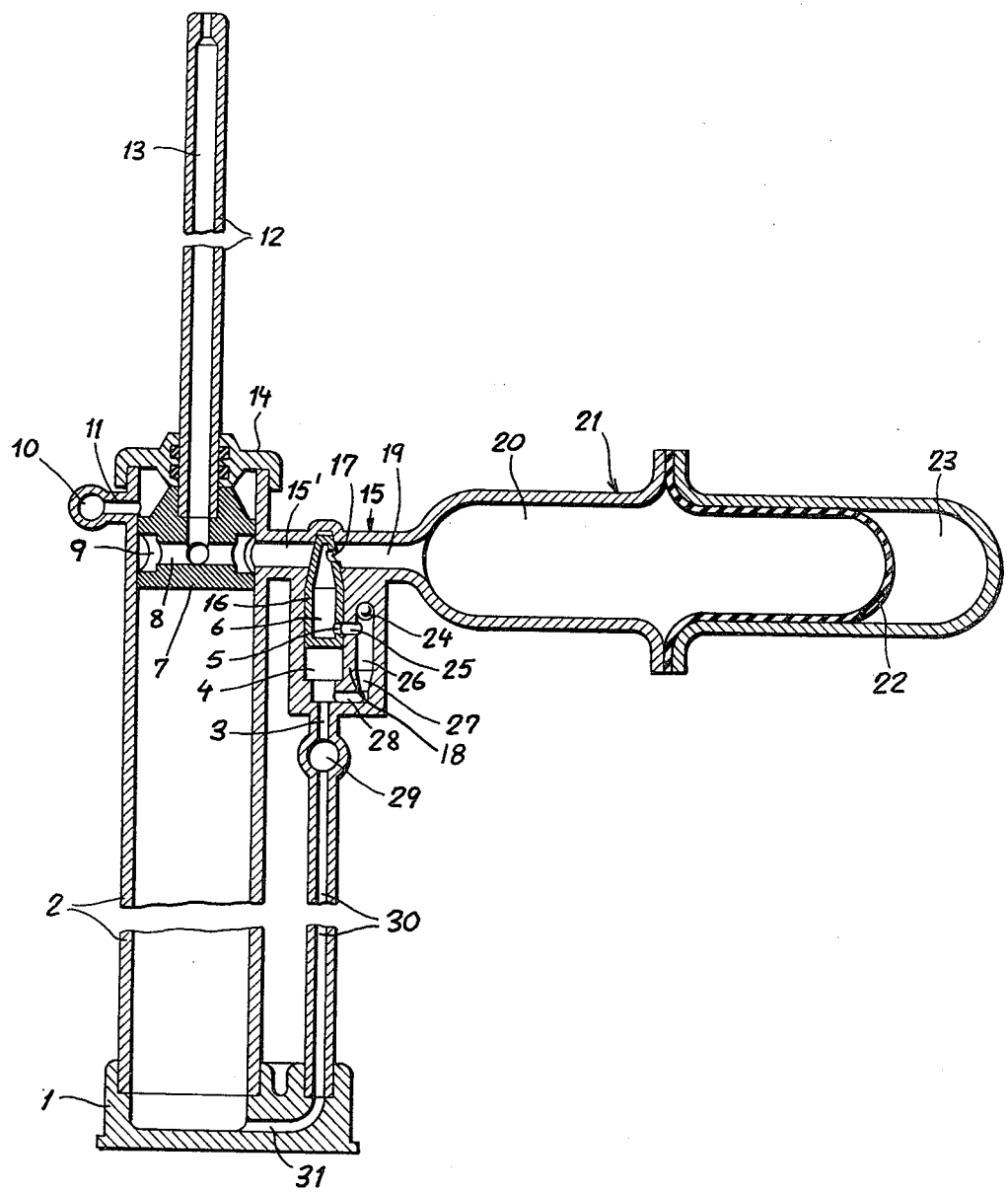

IMPULSE-TYPE SINKING HYDRANT

FIELD OF THE INVENTION

This invention relates to an impulse-type sinking hydrant to be used in stationary irrigation systems with synchronous impulse action.

BACKGROUND OF THE INVENTION

A known impulse-type sinking hydrant comprises a movable support in the upper end of which there is mounted a valve for the control of the impulse action, and a cylindrical housing connected at its bottom end to a water-air reservoir. Inside the movable support and the housing there are disposed two pipes, entering one into the other telescopically, from which the inner pipe is connected rigidly to an upright member and the valve for the control of the impulse action, while the outer pipe is rigidly fastened in the housing, passes through its bottom and is connected to the supply pipe conduit.

Another known sinking hydrant comprises a cylindrical housing, inside which there is mounted a movable upright member with a central longitudinal hole. The upright member ends with a closed fitted piston. In the external surface of the piston there is machined a ring-shaped groove, connected by means of radial passageways to the central passageway of the upright member.

A drawback of the known impulse-type sinking hydrant lies in that the telescopic pipes, disposed inside the movable upright member and the housing, make difficult the sealing of the movable components of the hydrant, increase the hydraulical losses during irrigation and lead to an increase of the diametral sizes of the hydrant, which proportionally increase the resistance forces of the soil when the upright member is raised above the ground surface. Another drawback lies in the large, unproductive with respect to the irrigation, volume comprising the volume of the housing and the volume of the upright member, which leads to a several-times increase of the volume of the water-air reservoir.

OBJECTS OF THE INVENTION

It is therefore a general object of the present invention to provide an impulse-type sinking hydrant with minimum diametral sizes, minimum energy losses of the water flow, minimum volume of the water conduits downstream of the water-air reservoir, without the necessity of adding additional components to the movable upright member, as well as to the housing of the hydrant.

SUMMARY OF THE INVENTION

This object is achieved in an impulse-type sinking hydrant, in which vertically to the supplying water conduit there is mounted a chamber with a vertically displaceable valve member formed with a cavity. The upper portion of the chamber is connected by means of a horizontal pipe to a ring-shaped groove formed in the piston, and to the water chamber of the water-air reservoir. In the upper end of the valve there is an opening, connecting the cavity to the water chamber, while in its lower end there is an opening which is coaxial with another opening in an intermediate wall of the chamber, connecting the cavity of the valve through a vertical conduit with a movable ball member and intermediate connections to the supply pipe conduit. In the bottom end of the vertical conduit there is machined a seat for the ball.

The advantages of the invention lie in that the connection of the water chamber of the water-air reservoir to the movable upright stem is effected in the uppermost portion of the housing, without the volume of the latter taking part in the lifting of the piston, thus reducing the hydraulic losses, and unproductive volume is considerably reduced. Moreover, a several-times reduction of the necessary volume of the reservoir with respect to the irrigation use of the pressure of the water accumulated inside it are achieved. The movable upright stem and the housing are not traversed by pipes, which enter telescopically one into another, disposed inside them, and this together with the closely machined piston of the movable upright stem permits a reduction of the diametral size of the hydrant, increasing the reliability of raising the upright stem above the ground surface and simplifying the sealing between the movable components.

BRIEF DESCRIPTION OF THE DRAWING

For a better understanding of the invention, reference should be made to the sole FIGURE of the accompanying drawing in which there is illustrated a vertical cross-sectional view taken along the axis of the impulse-type sinking hydrant.

SPECIFIC DESCRIPTION the impulse-type sinking hydrant comprises a housing 2, in which there is mounted a movable upright stem 12 ending with a closely fitted piston 7. In the external surface of the piston there is machined a ring-shaped groove 9 with radial bores 8, connecting the groove 9 to the central passageway 13 of the upright member 12. Vertically above a supply water conduit 29 there is mounted a chamber 4 with a vertically disposed valve member 16 formed with a cavity 6. The upper portion of chamber 4 is connected to a horizontal conduit 15 which communicates with the ring-shaped groove 9 in the piston 7 and with the water chamber 20 of the water-air reservoir 21. In the upper end of the valve member 16 there is an opening 17 connecting the water chamber 20 to cavity 6, while in its bottom end there is an opening 5, which is coaxial to a hole an opening 25 in the intermediate wall 18 of chamber 4, connecting the cavity 6 of valve 16, through a vertical conduit 26 with movable ball 24 and intermediate connections 28 and 3, to the water supply conduit 29. In the bottom end of the vertical conduit 26 there is machined a seat 27 for the ball 26.

The operation of the impulse-type sinking hydrant is as follows:

Initially before the turning on of the supply pressure conduit 29, the upright member 12 in the bottom position, i.e. it is retracted inside cylinder 2, while valve 16 and ball 24 are respectively in the bottom end of chamber 4 and the conical seat 27 of conduit 26. When the pressure pipe conduit 29 is turned on, the water enters through pipe 30 and passageway 31 in the bottom 1 of housing 2 and begins to push the piston 7 upward, together with the sinking upright stem 12. At the same time water enters through the passageway 3 into chamber 4, raises the valve member 16 and closes the member 15, and passing through opening 28 and conical seat 27, raises the ball 24. Through conduit 26, openings 25 and 5, cavity 6 of the valve 16 opening 17 and passageway 19, the water enters the water chamber 20 of the water-air reservoir 21, where by means of an elastic membrane 22, it begins to compress the air inside the air chamber 23, which has been compressed previously to a predetermined pressure. After the sinking upright stem 12 has been raised over the ground surface, i.e. when piston 7 has reached the end upper position, the xis of the radial bores 8 and the ring-shaped groove 9 coincide with the axis of passageways 15 and 19. The water in the space above the piston 7 in cylinder 2 is forced during the upward motion of piston 7 through the opening 11 into the additional pressure conduit system 10. After the end of the process of accumulation of water in the water chamber 20 of the water-air reservoir 21 and the equalizing of the pressure inside it with that of the water in the pressure supply pipe conduit 29, the ball 24 falls down in the conical seat 27 under the action of its own weight and closes the passageway 28. After a signal for reduced pressure in the supply conduit system 29 has been received, the valve 16 is moved downwards and the accumulated water from chamber 20 is forced through passageways 19, 15, 8 and 13 to the irrigation apparatus. This process is effected under the action of the compressed air in the air chamber 23. At all subsequent signals for increased and reduced pressure in the supply pipe conduit 29, the periodic processes of accumulating water in the water-air reservoir 21 take place with the sinking irrigation upright stem 12 in the extended position. If it is necessary to retract the sinking upright stem into the hydrant, the pipe conduit 29 is turned-off, and the additional pipe conduit 10 is turned-on, the piston 7 being moved downwards. The water from the space under the piston is forced through passageway 31 and pipe conduit 30 into the supply pipe conduit 29.

As is clear from the foregoing, pressurized water from the additional pipe conduit 10 drives the piston 7 downwardly into its bottom position.

What we claim is:

1. An impulse-type sinking hydrant comprising:
    an upright cylindrical housing;
    a closely-fitted piston in said cylindrical housing and movable between an upper and a lower position, said piston having at least one radial passageway;
    an upright stem on said piston formed with a through-going first passageway communicating with said radial passageway, said stem extending above said housing in the upper position of said piston;
    a pressure-accumulative reservoir provided at an upper end of said cylindrical housing and having a horizontal conduit formed with a secondary passageway communicating with the interior thereof and which lies in axial alignment with said radial passageway in the upper position of said piston;
    a first supply conduit communicating with said reservoir for feeding water under pressure thereto through a third passageway feeding into said second passageway and to the interior of said housing through a fourth passageway feeding into a lower end of said housing beneath said piston for displacing said piston into said upper position; and
    a valve member movable independently of said piston vertically disposed in a chamber in said third passageway and displaceable by the water pressure from said first supply conduit into a radial passageway blocking position for allowing said water to feed into said reservoir, said valve member being displaceable by a lowering of the water supply pressure into a first supply conduit blocking position for allowing the water from said reservoir to feed into said radial passageway.

2. The hydrant defined in claim 1 further comprising a second supply conduit communicating with the interior of said cylindrical housing at the upper end thereof above said piston for displacing said piston into said lower position with pressurized water from said second conduit.

3. The hydrant defined in claim 2 wherein:
    said piston has a ring-shaped groove on its periphery communicating with said radial passageway and alignable with said second passageway in said upper position of said piston;
    said pressure-accumulative reservoir is a water-air reservoir;
    said valve member has a cavity and is provided with an upper hole communicating with said cavity and opening into said reservoir in said radial passageway blocking position, and with a lower hole communicating between said cavity and said supply conduit in the last-mentioned position; and
    said valve member is movable in a structure provided with a ball valve engaging a seat to block outflow from said reservoir through said holes and said cavity when said valve member is in said last-mentioned position.

* * * * *